United States Patent
Hama

(10) Patent No.: US 9,438,591 B2
(45) Date of Patent: Sep. 6, 2016

(54) BIOMETRIC AUTHENTICATION DEVICE AND BIOMETRIC AUTHENTICATION METHOD

(71) Applicant: FUJITSU LIMITED, Kawasaki-shi, Kanagawa (JP)

(72) Inventor: Soichi Hama, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 13 days.

(21) Appl. No.: 14/568,643

(22) Filed: Dec. 12, 2014

(65) Prior Publication Data
US 2015/0180866 A1 Jun. 25, 2015

(30) Foreign Application Priority Data
Dec. 20, 2013 (JP) ................. 2013-264644

(51) Int. Cl.
*H04L 29/06* (2006.01)
*G06F 21/32* (2013.01)
*G06K 9/00* (2006.01)

(52) U.S. Cl.
CPC ........... *H04L 63/0861* (2013.01); *G06F 21/32* (2013.01); *G06K 9/00087* (2013.01); *G06F 2221/2139* (2013.01)

(58) Field of Classification Search
CPC ...... G06F 21/12; G06F 21/121; G06F 21/30; G06F 21/31; G06F 21/32; G06F 21/50; G06F 2221/2139; H04L 63/0861; G06K 9/00006; G06K 9/00013; G06K 9/00087; G06K 2009/0006; G06K 2009/00395
See application file for complete search history.

(56) References Cited

U.S. PATENT DOCUMENTS 7,289,790 B2 * 10/2007 McCorkle ............... G01S 7/023
                                                                455/404.2
8,499,164 B2 *  7/2013 Ortiz .................... H04L 63/0861
                                                                713/182

(Continued)

FOREIGN PATENT DOCUMENTS

JP      2006-53808      2/2006
JP      2006-237672     9/2006

(Continued)

OTHER PUBLICATIONS

Extended European Search Report dated May 19, 2015 in corresponding European Patent Application No. 14194476.9.

(Continued)

*Primary Examiner* — Eric W Shepperd
(74) *Attorney, Agent, or Firm* — Staas & Halsey LLP

(57) ABSTRACT

A biometric authentication device includes: a function module which executes a predetermined function; a biometric information acquisition unit which acquires biometric information of a user; a distance measurement unit which measures a distance to the user to output a measured value of the distance; a storage unit which stores data representing biometric information of a registrant; a biometric authentication unit which compares the acquired biometric information of the user with the biometric information of the registrant and authenticates the user when the biometric information of the user matches the biometric information of the registrant; a determination unit which determines whether or not to allow use of the predetermined function according to a temporal change of the measured value of the distance after the user has been authenticated; and a function control unit which controls enabling and disabling of the function module based on a determination result of the determination unit.

9 Claims, 4 Drawing Sheets

(56) References Cited

U.S. PATENT DOCUMENTS

| | | | |
|---|---|---|---|
| 8,509,495 B2* | 8/2013 | Xu | G06K 9/00013 |
| | | | 235/380 |
| 8,768,049 B2* | 7/2014 | Wang | G06K 9/00885 |
| | | | 382/115 |
| 9,152,868 B2* | 10/2015 | Smowton | H04L 9/3231 |
| 9,155,367 B2* | 10/2015 | Fathollahi | A45C 11/00 |
| 2007/0136581 A1* | 6/2007 | Hoghaug | G06F 21/31 |
| | | | 713/168 |
| 2008/0045806 A1* | 2/2008 | Keppler | A61B 5/0002 |
| | | | 600/300 |
| 2008/0226136 A1 | 9/2008 | Takaku et al. | |
| 2009/0166411 A1* | 7/2009 | Kramer | G06K 9/00013 |
| | | | 235/382 |
| 2010/0045788 A1* | 2/2010 | Zhang | G06K 9/00067 |
| | | | 348/77 |
| 2010/0322484 A1* | 12/2010 | Hama | G06F 21/32 |
| | | | 382/115 |
| 2011/0169934 A1* | 7/2011 | Pulluru | G06F 21/32 |
| | | | 348/77 |
| 2012/0030752 A1 | 2/2012 | Bruno et al. | |
| 2013/0231954 A1* | 9/2013 | Bryant | G06F 21/32 |
| | | | 705/3 |
| 2014/0196131 A1* | 7/2014 | Lee | G06F 21/32 |
| | | | 726/7 |
| 2014/0376784 A1* | 12/2014 | Aoki | G06K 9/00013 |
| | | | 382/115 |
| 2015/0088742 A1* | 3/2015 | Johnson | G06Q 20/385 |
| | | | 705/44 |
| 2015/0165174 A1* | 6/2015 | Helkowski | A61M 25/10184 |
| | | | 606/194 |

FOREIGN PATENT DOCUMENTS

| | | |
|---|---|---|
| JP | 2007-102373 | 4/2007 |
| JP | 2008-536347 | 9/2008 |
| JP | 2012-63217 | 3/2012 |
| WO | 2006/087503 A1 | 8/2006 |

OTHER PUBLICATIONS

Office Action dated Aug. 19, 2015 in corresponding Korean Patent Application No. 10-2014-0168510.

* cited by examiner

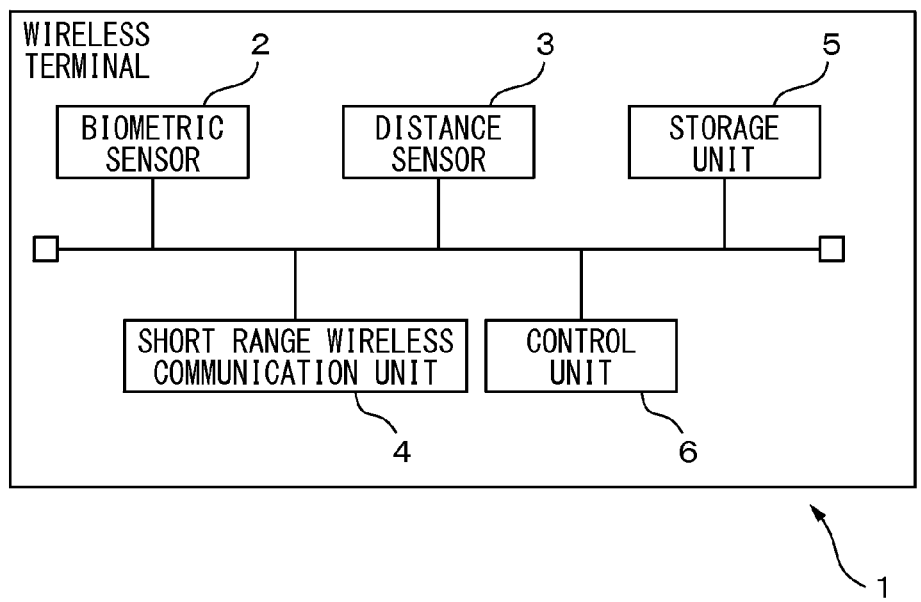
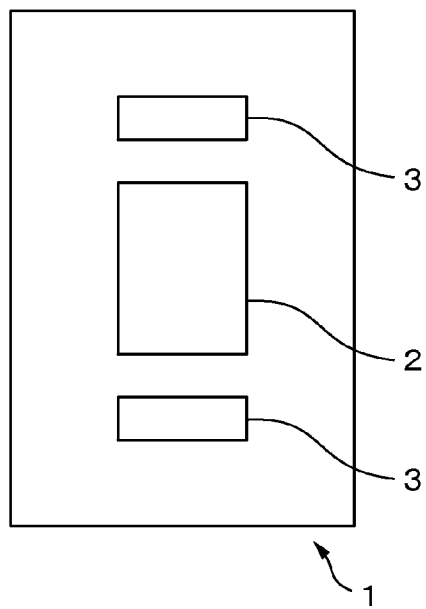 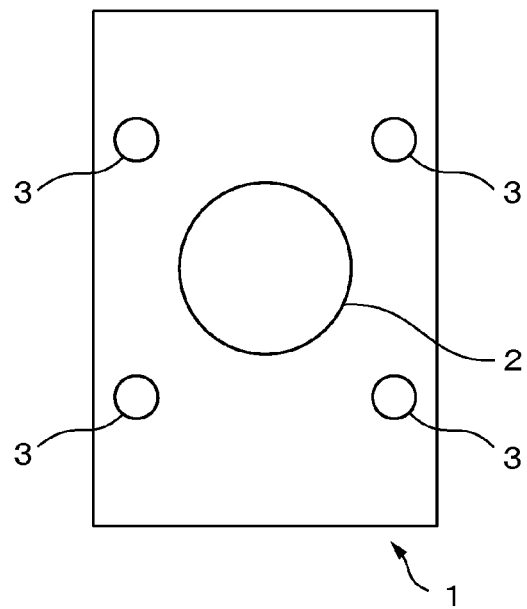

BIOMETRIC AUTHENTICATION DEVICE AND BIOMETRIC AUTHENTICATION METHOD

CROSS-REFERENCE TO RELATED APPLICATION

This application is based upon and claims the benefit of priority of the prior Japanese Patent Application No. 2013-264644, filed on Dec. 20, 2013, and the entire contents of which are incorporated herein by reference.

FIELD

The embodiments discussed herein are related to a biometric authentication device and a biometric authentication method.

BACKGROUND

In recent years, a terminal such as a mobile phone and a mobile information terminal capable of a short range wireless communication using a technology such as Radio Frequency IDentification (RFID) has been used. In such a short range wireless communication, a communication between a terminal and a reader is established only when a user intentionally holds the terminal over the reader or moves the terminal close to the reader since the communication range is limited to an order of several tens of cm. Thereby, information to be communicated is prevented from being leaked to a third party.

However, when the user loses the terminal or the terminal is stolen, there is a risk that the terminal may be improperly used by a third party. In response to such a risk, a means such as a remote lock function of the terminal is provided. Furthermore, a technology has been proposed in which a function of a non-contact IC chip is enabled only when a user has been authenticated by a biometric authentication (for example, refer to Japanese Laid-open Patent Publication No. 2006-53808). In addition, in some mobile terminals, a security function of a short range wireless function by means of a fingerprint authentication, which is a kind of a biometric authentication, is provided.

Biometric authentication is a technology for performing an identity verification using a physical feature such as a fingerprint, a face and a vein or a behavioral feature such as a signature and voice. These features are referred to as biometric information. In a biometric authentication, registered biometric information, which is biometric information of a registrant in advance, and input biometric information, which is biometric information of a user obtained in a situation that an identification of the user is required, are compared (matched). When the input biometric information matches the registered biometric information, it is verified that the user is the registrant. Biometric authentication is used for identity verification because only the registrant can provide legitimate biometric information when user verification is required.

In a technology in which a non-contact IC chip is enabled according to a result of a biometric authentication, there remains a risk that a terminal may be improperly used when the terminal is lost or stolen with the non-contact IC chip being enabled. In response to such a problem, a technology of setting an enabled time during which a short range communication device is enabled has been proposed (for example, refer to Published Japanese Translation of PCT International Publication for Patent Application (Kohyo) No. 2008-536347).

SUMMARY

However, in the technology described in Kohyo No. 2008-536347, there remains a problem that security against unauthorized use of the terminal is insufficient when the enabled time is too long whereas usability of the terminal is deteriorated when the enabled time is too short.

According to one embodiment, a biometric authentication device is provided. The biometric authentication device includes: a function module which executes a predetermined function; a biometric information acquisition unit for acquiring biometric information of a user; a distance measurement unit which measures a distance to the user and outputs a measured value of the distance; a storage unit which stores data representing biometric information of a registrant; a biometric authentication unit which compares the acquired biometric information of the user with the biometric information of the registrant and authenticates the user when the biometric information of the user matches the biometric information of the registrant; a determination unit which determines whether or not to allow use of the predetermined function according to a temporal change of the measured value of the distance after the user has been authenticated; and a function control unit which controls enabling and disabling of the function module based on a determination result of the determination unit.

The object and advantages of the invention will be realized and attained by means of the elements and combinations particularly indicated in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic structural diagram of a wireless terminal according to one embodiment of a biometric authentication device.

FIG. 2A is a plan view of a wireless terminal illustrating an example of an arrangement of a biometric sensor and distance sensors.

FIG. 2B is a plan view of a wireless terminal illustrating another example of an arrangement of a biometric sensor and distance sensors.

DESCRIPTION OF EMBODIMENTS

Figure 3:
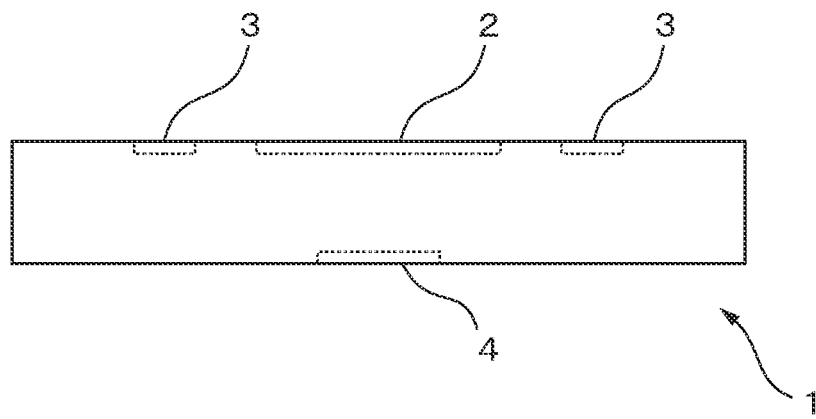
FIG. 3 is a side view of a wireless terminal illustrating an example of an arrangement of a biometric sensor, distance sensors and a short range wireless communication unit.

Hereinafter, a biometric authentication device according to one embodiment will be described referring to the drawings. The biometric authentication device includes a distance sensor and measures a distance from the distance sensor to a body part including biometric information. The biometric authentication device continuously monitors a temporal change of a measured value of the distance by the distance sensor from a time when a user has been authenticated as a registrant by a biometric authentication process using biometric information to a time when the user moves to a position where the user uses a predetermined function of the biometric authentication device. Thereby, the biometric authentication device determines whether or not the authenticated user is at a position of using the predetermined function and enables the predetermined function as long as the authenticated user is at the position of using the predetermined function.

In the present embodiment, it is assumed that the biometric authentication device is a wireless terminal and the predetermined function is a short range wireless communication. However, the biometric authentication device is not limited to a wireless terminal and may be any of various portable devices or a stationary device. The predetermined function is also not limited to the short range wireless communication and may be, for example, a camera, a telephone, a mailer or a scheduler.

FIG. 1 is a schematic structural diagram of a wireless terminal according to one embodiment of a biometric authentication device. As illustrated in FIG. 1, a wireless terminal 1 includes a biometric sensor 2, a distance sensor 3, a short range wireless communication unit 4, a storage unit 5 and a control unit 6. Note that the wireless terminal 1 may further include a user interface such as a touch panel. The wireless terminal 1 may also include a camera. In addition, the wireless terminal 1 may further include a wireless communication unit for wirelessly communicating with a base station according to a predetermined mobile communication standard.

The biometric sensor 2, which is an example of a biometric information acquisition unit, acquires biometric information of a user used for a biometric authentication process to generate data representing the biometric information. In the present embodiment, the biometric sensor 2 includes a vein sensor of a non-contact type which acquires a vein pattern of a palm as biometric information to generate a biometric image representing the vein pattern. However, the acquired biometric information may be biometric information other than a vein pattern of a palm, for example, a fingerprint or a palm print. Furthermore, the biometric sensor 2 may include a biometric sensor of a contact type.

For example, upon receiving a command for acquiring biometric information from the control unit 6, the biometric sensor 2 acquires biometric information of a user to generate a biometric image. The biometric sensor 2 then outputs the biometric image to the control unit 6.

The distance sensor 3, which is an example of a distance measurement unit, measures a distance from the distance sensor 3 to a user. In the present embodiment, the distance sensor 3 measures a distance from the distance sensor 3 to a body part (for example, a hand) of the user including biometric information used for a biometric authentication process as the distance from the distance sensor 3 to the user. The distance sensor 3, for example, measures the distance at each predetermined measurement period, from a time when a start of a measurement is instructed until a time when a termination of the measurement is instructed by the control unit 6. Note that, when the measurement period of the distance sensor 3 is too long, the wireless terminal 1 may not detect that a hand of the authenticated user is replaced with a hand of a third party. Accordingly, the measurement period of the distance sensor 3 is set to, for example, 30 msec to 100 msec which is sufficiently shorter than a time it takes to replace a hand of a user with a hand of a third party. The time is determined by a response speed of a human motion.

The control unit 6 instructs the distance sensor 3 to start a measurement when, for example, a user requests use of a predetermined function on a user interface (not illustrated) of the wireless terminal 1 or presses a start button (not illustrated). Furthermore, the control unit 6 instructs the distance sensor 3 to terminate the measurement when the control unit 6 detects that the user has terminated the use of the predetermined function. Alternatively, the distance sensor 3 may measure the distance to the user at a constant period of time while the wireless terminal 1 is turned on.

Note that the number of the distance sensors 3 included in the wireless terminal 1 is not limited to one and may be plural. Various types of distance sensors such as an optical distance sensor and a distance sensor using ultrasonic may be used as the distance sensor 3. Every time the distance sensor 3 measures a distance to a body part of a user including biometric information, the distance sensor 3 outputs a measured value to the control unit 6.

Each of FIGS. 2A and 2B is a plan view of the wireless terminal 1 illustrating an example of an arrangement of the biometric sensor 2 and the distance sensors 3. In the example illustrated in FIG. 2A, the wireless terminal 1 includes two distance sensors 3. The biometric sensor 2 and the two distance sensors 3 are arranged in a row along the longitudinal direction of the wireless terminal 1 and in the same plane. The biometric sensor 2 is arranged between the two distance sensors 3. Thereby, after holding a body part including biometric information over the biometric sensor 2 to let the biometric sensor 2 read the biometric information, even when a user moves the body part including the biometric information in either side along the longitudinal direction of the wireless terminal 1, one of the distance sensors 3 can measure a distance to the body part.

In the example illustrated in FIG. 2B, the wireless terminal 1 includes four distance sensors 3. In this example, the biometric sensor 2 and the four distance sensors 3 are arranged in the same plane of the wireless terminal 1. The four distance sensors 3 are arranged such that distances from the center of the biometric sensor 2 are equal and distances between two adjacent distance sensors 3 are all equal. Thereby, after holding a body part including biometric information over the biometric sensor 2 to let the biometric sensor read the biometric information, even when a user moves the body part including the biometric information in any direction, one of the distance sensors 3 can measure a distance to the body part. It is preferable that, as illustrated in FIGS. 2A and 2B, each distance sensor 3 and the biometric sensor 2 are arranged in the same plane of the wireless terminal 1. Thereby, the wireless terminal 1 can continuously measure a change of a distance from the distance sensor 3 to a body part including biometric information during a period from a time when the biometric information is acquired by the biometric sensor 2 to a time when a user holds the wireless terminal 1 with the body part including the biometric information. Furthermore, by arranging each distance sensor 3 and the biometric sensor 2 in the same plane, the wireless terminal 1 can determine whether or not the body part including the biometric information has been placed at a suitable position for the biometric sensor 2 to acquire the biometric information based on measured values of the distances by the distance sensors 3.

The short range wireless communication unit 4, which is an example of a function module for executing a predetermined function, includes a communication circuit for wirelessly communicating with other devices according to a predetermined short range wireless communication standard. The short range wireless communication unit 4 wirelessly communicates with other devices as long as they are enabled by the control unit 6. The short range wireless communication standard with which the short range wireless communication unit 4 is compliant may be, for example, ISO/IEC 14443, ISO/IEC 15693 or ISO/IEC 18092.

FIG. 3 is a side view of the wireless terminal 1 illustrating an example of an arrangement of the biometric sensor 2, the distance sensors 3 and the short range wireless communication unit 4. The short range wireless communication unit 4 is arranged on a surface (hereinafter, for convenience, referred to as a back surface) opposite to a surface (hereinafter, for convenience, referred to as a front surface) of the wireless terminal 1 on which the biometric sensor 2 and distance sensors 3 are arranged. Thereby, when using a short range wireless communication, a user holds the wireless terminal 1 such that the back surface of the wireless terminal 1 faces a device to communicate with. Accordingly, for example, when the user holds the sides of the wireless terminal 1 with the fingers, the front surface on which the biometric sensor 2 and the distance sensors 3 are arranged will come close to the palm.

The storage unit 5 includes, for example, a non-volatile semiconductor memory and a volatile semiconductor memory. The storage unit 5 stores various application programs used by the wireless terminal 1, data used by the application programs and the like. The storage unit 5 also stores a program for executing a biometric authentication process. The storage unit 5 also stores a user name, user identification information and personal configuration information of at least one registrant. Furthermore, the storage unit 5 stores, for each registrant, reference data representing a feature of a vein pattern of either a left or right palm which is registered biometric information of the registrant. The reference data includes, for example, a position or a type of each feature point representing a characteristic structure such as an ending or a bifurcation of a vein extracted from a biometric image generated at a time of registering the registrant or at a time of updating the reference data. Alternatively, the reference data may be the biometric image itself or a part thereof generated at a time of registering the registrant or at a time of updating the reference data.

The control unit 6 includes one or a plurality of processors and a peripheral circuit thereof. The control unit 6 executes a biometric authentication process using a biometric image representing biometric information of a user obtained from the biometric sensor 2 and determines whether or not to enable the short range wireless communication unit 4 based on a result of the authentication process and a measured value of the distance from the distance sensor 3.

Figure 4:
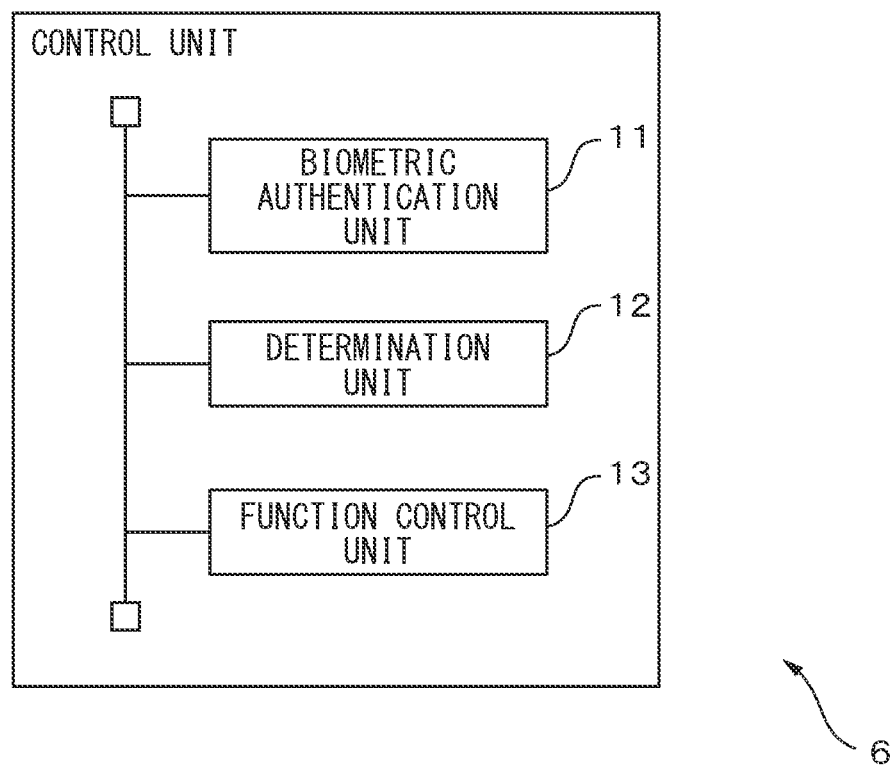
FIG. 4 is a functional block diagram of a control unit.

FIG. 4 is a functional block diagram of the control unit 6. The control unit 6 includes a biometric authentication unit 11, a determination unit 12 and a function control unit 13. The biometric authentication unit 11, the determination unit 12 and the function control unit 13 are, for example, functional modules implemented by a computer program which operates on a processor included in the control unit 6. Alternatively, the biometric authentication unit 11, the determination unit 12 and the function control unit 13 may be implemented as one integrated circuit realizing these functions, separately from the processor included in the control unit 6.

The biometric authentication unit 11 determines whether or not to authenticate a user as a registrant by matching biometric information of the user represented in a biometric image received from the biometric sensor 2 with biometric information of the registrant.

The biometric authentication unit 11 generates, from a biometric image, reference data representing a feature of biometric information captured in the biometric image. For example, when the wireless terminal 1 performs a matching process by minutiae matching, the biometric authentication unit 11 extracts a feature point used by the minutiae matching from the biometric image. The biometric authentication unit 11 then sets a position of the feature point or a type of the feature point to be reference data.

For this reason, the biometric authentication unit 11 distinguishes between an object area in which a body part including biometric information is captured and a background area in which the body part is not captured on the biometric image. For example, luminance values of pixels in which a body part including biometric information is captured are greater than luminance values of pixels in which biometric information is not captured. Thus, the biometric authentication unit 11 binarizes the biometric image such that, for example, a set of pixels having luminance values equal to or greater than an object determination threshold value constitutes an object area and a set of pixels having luminance values less than the object determination threshold value constitutes a background area. The object determination threshold value is set to, for example, a predetermined fixed value (for example, 150) or an average value of luminance values of all pixels in the biometric image.

Furthermore, the biometric authentication unit 11 distinguishes, in the object area, between a vein area which is a set of pixels in which a vein is captured and a non-vein area which is a set of pixels in which a vein is not captured. For example, luminance values of pixels in which a vein is captured is less than luminance values of pixels in which a vein is not captured. Thus, the biometric authentication unit 11 binarizes the object area such that, for example, a set of pixels having luminance values equal to or less than a vein determination threshold value constitutes a vein area and a set of pixels having luminance values greater than the vein determination threshold value constitutes a non-vein area. The vein determination threshold value is set to a predetermined fixed value (for example, 200) or an average value of luminance values of all pixels in the object area.

Then, the biometric authentication unit 11 generates a thinned binary image in which the vein is thinned by, for example, performing a thinning process on a set of pixels having luminance values corresponding to the vein on the binarized object area. By scanning the thinned binary image using a plurality of templates corresponding to either a bifurcation or an ending of a vein, the biometric authentication unit 11 detects a position on the thinned binary image at which one of the templates matches. The biometric authentication unit 11 then extracts a center pixel of the detected position as a feature point.

Note that the biometric authentication unit 11 may extract a feature point from a biometric image using other known methods in which an ending and a bifurcation of a vein are obtained as feature points. Furthermore, the biometric authentication unit 11 may also obtain other features representing a feature of a vein pattern on a biometric image as reference data. For example, the biometric authentication unit 11 may obtain the number of veins for each block as reference data by partitioning the object area into a plurality of blocks.

In addition, when the wireless terminal 1 performs a matching process by pattern matching, the biometric authentication unit 11 may set, as reference data, a biometric image itself or a circumscribed rectangular area or an inscribed rectangular area of the object area extracted from the biometric image.

The biometric authentication unit 11 reads reference data of a registrant from the storage unit 5. Note that, when a plurality of registrants are registered in the wireless terminal 1, the biometric authentication unit 11 receives a user name or a user identification number via an operation of a user interface (not illustrated) by a user. The biometric authentication unit 11 may read, from the storage unit 5, reference data of a registrant corresponding to the user name or the user identification number. The biometric authentication unit 11 then matches the reference data of the user and the reference data of the registrant. The biometric authentication unit 11 then calculates a degree of similarity between the biometric information of the user and the biometric information of the registrant as a result of the matching process.

The biometric authentication unit 11 obtains the number of feature points which match between feature points included in the reference data of the registrant and feature points included in the reference data of the user with respect to the vein pattern when using the minutiae matching. The biometric authentication unit 11 then calculates a degree of similarity by dividing the number of the matched feature points by the number of feature points extracted from the vein pattern of the user. Alternatively, when using the pattern matching, the biometric authentication unit 11 calculates a normalized cross-correlation value while changing a relative position between the biometric image and a biometric image in which the vein pattern of the registrant is captured. The biometric authentication unit 11 then sets the maximum value of the normalized cross-correlation value to the degree of similarity.

The biometric authentication unit 11 determines that the biometric information of the user matches the biometric information of the registrant when the degree of similarity is equal to or greater than an authentication determination threshold value. The biometric authentication unit 11 then authenticates the user as the registrant.

On the other hand, the biometric authentication unit 11 determines that the biometric information of the user does not match the biometric information of the registrant when the degree of similarity is less than the authentication determination threshold value. In this case, the biometric authentication unit 11 does not authenticate the user.

It is preferable that the authentication determination threshold value is set to a value such that the biometric authentication unit 11 succeeds in authentication only when the registrant is a user. It is also preferable that the authentication determination threshold value is set to a value such that the biometric authentication unit 11 fails in authentication when a user differs from the registrant. For example, the authentication determination threshold value may be set to a value obtained by adding a value obtained by multiplying a difference between the maximum value and the minimum value which the degree of similarity can take by 0.7 to the minimum value of the degree of similarity.

The biometric authentication unit 11 notifies the determination unit 12 and the function control unit 13 of a determination result whether or not the user has been authenticated.

The determination unit 12 determines whether or not a predetermined function (in the present embodiment, a short range wireless communication by the short range wireless communication unit 4) is allowed for use according to a temporal change of measured values of the distance after the user has been authenticated. For this reason, the determination unit 12 instructs the distance sensor 3 to start a measurement of the distance when the user performs an operation to start using the short range wireless communication unit 4 via, for example, a user interface (not illustrated). The determination unit 12 then starts monitoring a measured value of the distance received from the distance sensor 3. The determination unit 12 determines whether or not the measured value of the distance is within an appropriate range which is a range of a distance between the biometric sensor 2 and a body part including biometric information of a user and is a range of distance appropriate for acquiring the biometric information by the biometric sensor 2. The determination unit 12 then sends to the biometric sensor 2 a command to execute acquisition of biometric information when the measured value of the distance has entered within the appropriate range. Note that, when the wireless terminal 1 includes a plurality of distance sensors 3, the determination unit 12 may send the command to execute acquisition of biometric information when any measured value among measured values from all distance sensors 3 has entered within the appropriate range for acquisition. Alternatively, the determination unit 12 may send a command to execute acquisition of biometric information when a measured value from each of two or more distance sensors 3 opposed to each other across the biometric sensor 2 has entered within the appropriate range for acquisition.

Furthermore, the determination unit 12 continuously checks a measured value of the distance from the distance sensor 3 during a period from authentication of a user to a termination of use of the short range wireless communication by the user. Thereby, the determination unit 12 determines whether or not the authenticated user uses the short range wireless communication.

Figure 5:
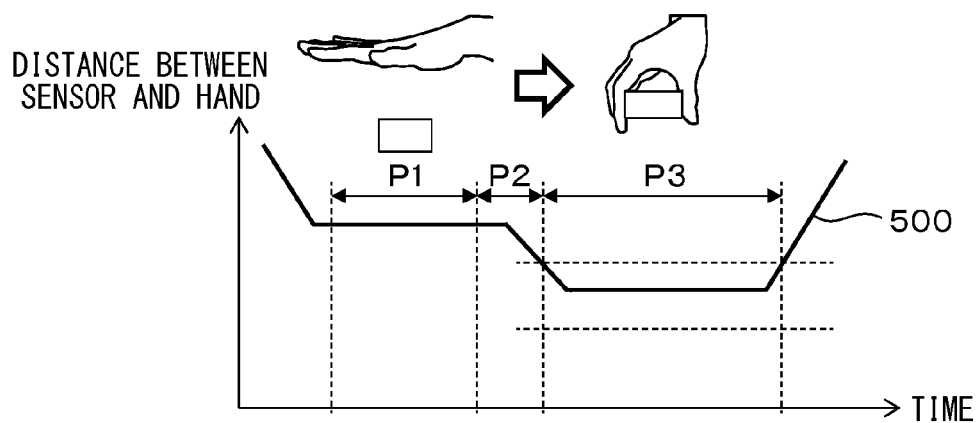
FIG. 5 is a diagram illustrating an example of a temporal change of a distance between a body part including the biometric information of a user and a distance sensor from a time of execution of biometric authentication to a time of termination of use of a short range wireless communication.

Referring to FIG. 5, a change of a distance between a body part including biometric information of a user and the distance sensor 3 from a time of execution of biometric authentication to a time of a termination of use of the short range wireless communication will be explained. Note that, in this example, the short range wireless communication unit 4 is assumed to be arranged on a surface opposite to a surface on which the biometric sensor 2 and the distance sensors 3 are arranged as illustrated in FIG. 3. In FIG. 5, the horizontal axis represents time and the vertical axis represents a distance.

As illustrated in a graph 500, in a period P1 in which a matching between biometric information of a user and biometric information of a registrant is being performed, the user places a hand at a position away from the biometric sensor 2 by an appropriate distance in order to let the biometric sensor 2 read the biometric information. Then, upon the wireless terminal 1 successfully authenticating the user, the user moves the hand close to the wireless terminal 1 to hold the wireless terminal 1. Therefore, in a period P2 from the end of the period P1 to a time when the user grips the wireless terminal 1, a distance from the distance sensor 3 to the user's hand gradually decreases. In a period P3 in which the user is using the short range wireless communication, the distance from the distance sensor 3 to the user's hand remains substantially constant since the user is holding the wireless terminal 1. Upon the user terminating the use of the short range wireless communication, the distance from the distance sensor 3 to the user's hand increases since the user changes a way of holding the wireless terminal 1 or releases the wireless terminal 1.

Thus, when an authenticated user uses any function of the wireless terminal 1, a distance from the distance sensor 3 to a body part including biometric information of the user changes from a distance suitable for the biometric sensor 2 reading the biometric information to a distance suitable for the user using the function. Accordingly, the determination unit 12 continuously monitors a measured value of the distance by the distance sensor 3 after authentication of the user. In a period from a time of the authentication to a time of a start of using the function, the determination unit 12 determines whether or not an amount of deviation of a measured value from an expected trajectory of a temporal change of the distance from the distance sensor 3 to the body part including the biometric information of the user is within a tolerable range every time a measured value of the distance is received from the distance sensor 3. The determination unit 12 then determines that the authenticated user has moved to a position of using a predetermined function when the measured value of the distance has become a distance corresponding to a position at which the user uses the predetermined function without deviating from the tolerable range. Furthermore, the determination unit 12 determines whether or not the measured value of the distance deviates from a distance to the user corresponding to a case in which the user is at a position of using the predetermined function after the user having started use of the predetermined function. The determination unit 12 then determines that the user has terminated the use of the predetermined function when the measured value of the distance deviates from the distance to the user corresponding to a case in which the user is at a position of using the predetermined function.

Note that, when there are a plurality of distance sensors 3, the determination unit 12 sets a measured value to be monitored to, for example, a measured value of the distance sensor 3 specified in advance or a measured value from the distance sensor 3 whose measured value was minimum at a time of authentication. Alternatively, the determination unit 12 may set the measured value to be monitored to an average value of latest measured values obtained from each distance sensor 3.

Figure 6:
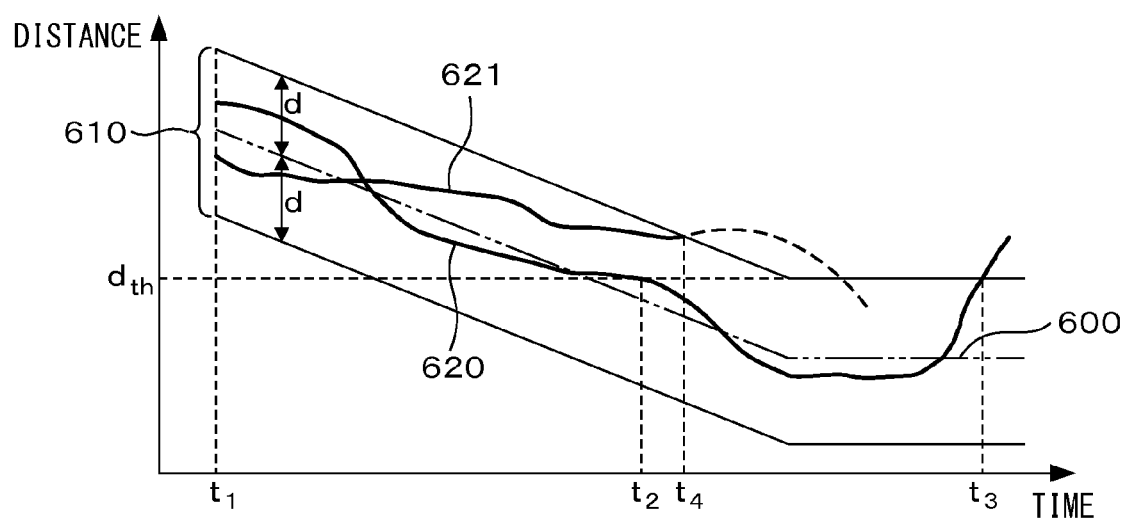
FIG. 6 is a diagram illustrating an example of a tolerable range for a distance between a body part including biometric information of a user and a distance sensor.

FIG. 6 is a diagram illustrating an example of a tolerable range for a distance between a body part including biometric information of a user (a hand, in the present embodiment) and the distance sensor 3. In FIG. 6, the horizontal axis represents time and the vertical axis represents a distance. At time t1, it is assumed that the biometric authentication unit 11 has successfully authenticated a user. A trajectory 600 represents an average trajectory when an authenticated user moves the hand from a position suitable for the biometric sensor 2 reading biometric information to a position of using a short range wireless communication of the wireless terminal 1, i.e., a position of holding the wireless terminal 1. A tolerable range 610 is set so as to have a width of ±d from the trajectory 600 at each time point. Note that d is set, for example, to an expected maximum value of an amount of deviation from an average trajectory when authenticated users move hands to a position of holding the wireless terminal 1.

Each of trajectories 620 and 621 represent temporal changes of measured values of the distances by the distance sensor 3 on and after time t1. The trajectory 620 never deviates from the tolerable range 610 in a period from time t1 to time t2 and a measured value of a distance at time t2 becomes equal to or less than a terminal hold distance dth which is a distance from the distance sensor 3 to the user's hand when the user holds the wireless terminal 1. Note that a distance from the distance sensor 3 to a user's hand of holding the wireless terminal 1 varies depending on a size of the wireless terminal 1, a size of a user's hand, a habit of holding an object, or the like. Therefore, it is preferable that the terminal hold distance dth be set to an expected maximum value of a distance from the distance sensor 3 to the hand when the user is holding the wireless terminal 1. Alternatively, the terminal hold distance dth may be set for each registrant in advance and stored in the storage unit 5. In this case, the determination unit 12 can better determine whether or not a user has held the wireless terminal 1 since the optimum terminal hold distance dth is set for each registrant.

When a measured value of the distance has become equal to or less than the terminal hold distance dth, the determination unit 12 determines that the authenticated user has held the wireless terminal 1 in order to use a predetermined function (the short range wireless communication, in the present embodiment) of the wireless terminal 1. At time t2, the determination unit 12 then notifies the function control unit 13 of enabling the short range wireless communication unit 4. The function control unit 13 enables the short range wireless communication unit 4. Then, when a measured value of the distance exceeds the terminal hold distance dth at time t3, the determination unit 12 determines that the authenticated user has released the wireless terminal 1, i.e., the authenticated user has moved the hand to a position different from a position of using the short range wireless communication. The determination unit 12 then notifies the function control unit 13 of disabling the short range wireless communication unit 4. The function control unit 13 disables the short range wireless communication unit 4. Accordingly, the wireless terminal 1 can enable the short range wireless communication unit 4 only for a period necessary and sufficient for the authenticated user using the short range wireless communication. Note that the determination unit 12 may keep the short range wireless communication unit 4 enabled when a period in which a measured value of the distance has exceeded the terminal hold distance dth is less than a predetermined grace period (for example, one second). Thereby, usability of the wireless terminal 1 is improved since disabling the short range wireless communication unit 4 is suppressed to the extent of a case that a user has no intention to terminate the use of the short range wireless communication unit 4 as in the case that the user only changes slightly a way of holding the wireless terminal 1.

On the other hand, in the trajectory 621, the measured value of the distance is out of the tolerable range 610 at time t4 before becoming equal to or less than the terminal hold distance dth. In this case, the determination unit 12 determines that the authenticated user has stopped in holding the wireless terminal 1 for some reasons and notifies the function control unit 13 of disabling the short range wireless communication unit 4. The function control unit 13 then disables the short range wireless communication unit 4.

Then, the determination unit 12 terminates to continuously monitor a measured value of the distance. Accordingly, as illustrated in a dotted line, the short range wireless communication unit 4 remains disabled even when the measured value of the distance is equal to or less than the terminal hold distance dth after time t4. In such a case, there is a possibility that a person who has come close to the wireless terminal 1 after time t4 is a person other than the authenticated user and there would be a risk that the function of the short range wireless communication be used improperly when the short range wireless communication unit 4 is enabled in such a case.

Note that a relationship between a distance between the distance sensor 3 and a body part including biometric information at a time when the biometric sensor 2 acquires the biometric information and a distance between the distance sensor 3 and the body part at a time when a user uses the predetermined function of the wireless terminal 1 is different depending on a positional relationship among the biometric sensor 2, the distance sensor 3 and the function module. For example, in some cases, a distance between the distance sensor 3 and a body part including biometric information at a time when a user uses the predetermined function of the wireless terminal 1 is longer than a distance between the distance sensor 3 and the body part at a time when the biometric sensor 2 acquires the biometric information. Thus, a tolerable range for a measured value of the distance in a period from a time when a user having been authenticated to a time when use of the predetermined function is started may be determined according to a positional relationship among the biometric sensor 2, the distance sensor 3 and the function module. Similarly, a condition for a measured value of the distance to determine that a user has moved to a position of a user using the predetermined function may be determined according to a positional relationship among the biometric sensor 2, the distance sensor 3 and the function module.

The function control unit 13 controls enabling and disabling of the function module based on a determination result of the determination unit 12. In the present embodiment, when being instructed by the determination unit 12 to enable a predetermined function (the short range wireless communication, in the present embodiment) of the wireless terminal 1, the function control unit 13 enables the function module (the short range wireless communication unit 4, in the present embodiment) for executing the predetermined function. For example, when enabling the short range wireless communication unit 4, the function control unit 13 controls a power supply circuit (not illustrated) to cause supplying power to the short range wireless communication unit 4 to be started. Furthermore, the function control unit 13 allows a user to use the short range wireless communication by retrieving a program required for execution of the short range wireless communication from the storage unit 5 and by executing the program.

On the other hand, when being instructed by the determination unit 12 to disable the short range wireless communication, the function control unit 13 disables the short range wireless communication unit 4. For example, when disabling the short range wireless communication unit 4, the function control unit 13 controls a power supply circuit (not illustrated) to cause supplying power to the short range wireless communication unit 4 to be stopped. Furthermore, the function control unit 13 stops execution of the program required for execution of the short range wireless communication. Note that the function control unit 13 may discard biometric images acquired for biometric authentication of a user when disabling the short range wireless communication unit 4.

Figure 7:
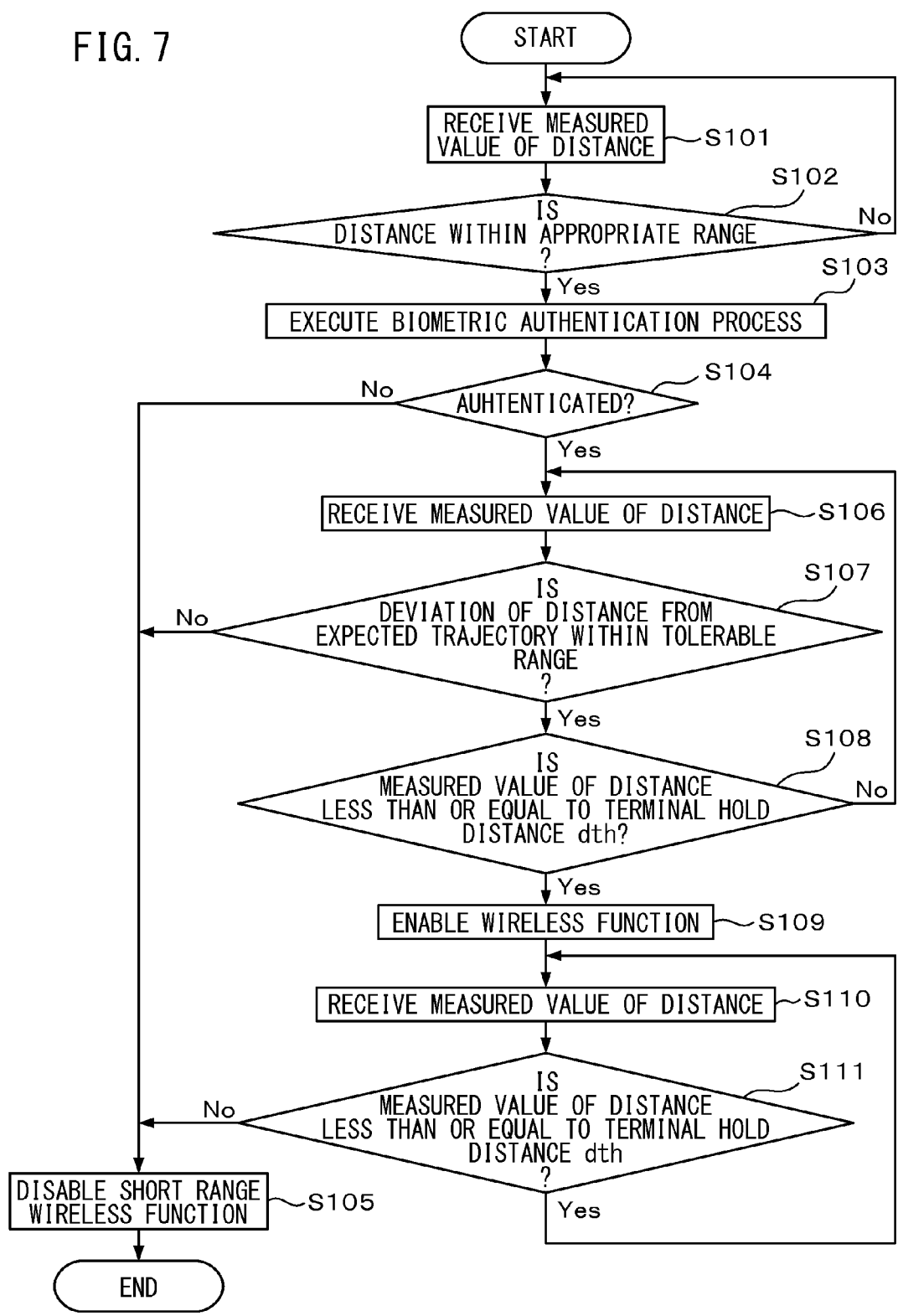
FIG. 7 is an operational flowchart of a biometric authentication process.

FIG. 7 is an operational flowchart of a biometric authentication process. The control unit 6 executes a biometric authentication process according to the following operational flowchart every time execution of the predetermined function is requested.

The determination unit 12 receives a measured value of a distance from the distance sensor 3 (step S101). The determination unit 12 determines whether or not the measured value of the distance is within an appropriate range for acquisition of biometric information (step S102). When the measured value of the distance is not within the appropriate range for acquisition of biometric information (No at step S102), the determination unit 12 repeats processes on and after step S101.

On the other hand, when the measured value of the distance is within the appropriate range for acquisition of biometric information (Yes at step S102), the determination unit 12 sends a command to acquire biometric information to the biometric sensor 2. The biometric sensor 2 then acquires biometric information of a user, generates a biometric image representing the biometric information and outputs the biometric image to the control unit 6. The control unit 6 retrieves data representing biometric information of a registrant from the storage unit 5. The biometric authentication unit 11 then executes a biometric authentication process for the user by matching the biometric information captured in the received biometric image with the biometric information of the registrant (step S103). The biometric authentication unit 11 determines whether or not to authenticate the user as the registrant based on a result of the biometric authentication process (step S104).

When having failed to authenticate the user (No at step S104), the biometric authentication unit 11 notifies the function control unit 13 of disabling the short range wireless communication. The function control unit 13 disables the short range wireless communication unit 4 (step S105) and then the control unit 6 terminates the biometric authentication process.

On the other hand, when the biometric authentication unit 11 has succeeded in authenticating the user (Yes at step S104), the determination unit 12 receives a measured value of a distance from the distance sensor 3 (step S106). The determination unit 12 then determines whether or not a deviation of the measured value of the distance from an expected trajectory is within the tolerable range (step S107). When the deviation of the measured value of the distance from the expected trajectory is out of the tolerable range (No at step S107), the determination unit 12 notifies the function control unit 13 of disabling the short range wireless communication. The function control unit 13 disables the short range wireless communication unit 4 (step S105) and then the control unit 6 terminates the biometric authentication process.

On the other hand, when the deviation of the measured value of the distance from the expected trajectory is within the tolerable range (Yes at step S107), the determination unit 12 determines whether or not the measured value of the distance is equal to or less than the terminal hold distance dth (step S108). When the measured value of the distance is longer than the terminal hold distance dth (No at step S108), the determination unit 12 repeats processes on and after step S106.

On the other hand, the measured value of the distance is equal to or less than the terminal hold distance dth (Yes at step S108), the determination unit 12 determines that the user's hand has hold the wireless terminal 1, i.e., the user has moved to a position at which the user uses the short range wireless communication of the wireless terminal 1. The determination unit 12 notifies the function control unit 13 of enabling the short range wireless communication. The function control unit 13 enables the short range wireless communication unit 4 (step S109).

Following step S109, the determination unit 12 receives a measured value of a distance from the distance sensor 3 (step S110). The determination unit 12 then determines whether or not the measured value of the distance is equal to or less than the terminal hold distance dth (step S111). When the measured value of the distance is equal to or less than the terminal hold distance dth (Yes at step S111), the determination unit 12 repeats processes on and after step S110. In other words, the short range wireless communication unit 4 remains enabled.

On the other hand, when the measured value of the distance is longer than the terminal hold distance dth (No at step S111), the determination unit 12 determines that the user has released the wireless terminal 1. The determination unit 12 notifies the function control unit 13 of disabling the short range wireless communication. The function control unit 13 then disables the short range wireless communication unit 4 (step S105) and thereafter the control unit 6 terminates the biometric authentication process.

As has been described above, after having succeeded in authenticating a user, a wireless terminal which is an example of a biometric authentication device continuously monitors a measured value of a distance from a distance sensor to a body part including biometric information of the user. The wireless terminal enables the predetermined function when an authenticated user is assumed to hold the wireless terminal based on a trajectory of a change of the measured value of the distance. Furthermore, the wireless terminal disables the predetermined function when the authenticated user moves the body part including the biometric information away from a position at which the predetermined function is used. Accordingly, the wireless terminal can enable the predetermined function only for a period necessary and sufficient for the authenticated user using the predetermined function. As a result, the wireless terminal can prevent a third party from improperly using the predetermined function. In addition, once a measured value of a distance deviates from a tolerable range in a period from a time of authenticating a user to a time of starting use of a predetermined function, the wireless terminal will not enable the predetermined function even when the measured value of the distance becomes a distance corresponding to a position of using the predetermined function thereafter. Accordingly, the wireless terminal can prevent a third party from using the predetermined function when pretending to be the authenticated user.

Furthermore, the wireless terminal properly recognizes a change of a position of a user during a period from a time of executing biometric authentication to a time of using a predetermined function by arranging a distance sensor to measure a distance to a body part including biometric information used for biometric authentication. Therefore, the wireless terminal appropriately determines whether or not a person who intends to use the predetermined function is the authenticated user by continuously monitoring the measured value of the distance by the distance sensor arranged in such a way.

In addition, since a temporal change of a measured value of a distance by a distance sensor is only an amount of one dimension, an operation amount of determination of enabling or disabling a predetermined function based on the measured value of the distance described above may be very small. Therefore, an inexpensive processor with low processing performance may be used as a processor of the control unit.

Note that, according to a modified example, a biometric authentication device may include a contact sensor in a place where a user holds the biometric authentication device when executing a predetermined function. In this case, when a measured value of a distance by a distance sensor is equal to or less than a terminal hold distance and the contact sensor has detected a contact of an object, the biometric authentication device may determine that a body part including biometric information of the user has moved to a position of using the predetermined function and may enable the predetermined function. In the modified example, after once enabling the predetermined function, the biometric authentication device may disable the predetermined function when the contact sensor stops detecting the contact of the object.

Furthermore, according to another modified example, a distance sensor may measure a distance to a body part of a user other than a body part including biometric information as a distance from the distance sensor to the user. For example, the distance sensor may measure a distance to the head of the user when a biometric authentication device executes a biometric authentication process using biometric information included in a hand such as a vein pattern of a palm and a fingerprint. After the user has been authenticated, the biometric authentication device may continuously monitor a measured value of a distance to the head of the user to determine whether or not the authenticated user has moved to a position of using the predetermined function. In this example, the distance sensor may be arranged in a position different from the biometric authentication device body.

According to still another modified example, when an authenticated user has moved to a position of using a short range wireless communication, another function may be enabled together with the short range wireless communication. For example, after the short range wireless communication has been enabled with the authenticated user holding the wireless terminal, when the user moves the wireless terminal close to a reader, a predetermined function included in the reader side may be enabled. In this case, when the reader can no longer communicate with the wireless terminal due to the short range wireless communication being disabled as a result that the authenticated user has moved the hand away from the wireless terminal, the reader disables the enabled function.

According to yet another modified example, a user may be authenticated using authentication information other than biometric information. An authentication device according to this modified example includes an input unit for inputting authentication information (for example, identification information and a password of the user) required for user authentication such as a touch panel instead of a biometric information acquisition unit in the biometric authentication device according to the embodiment or modified examples described above. When the authentication device acquires identification information and a password of a user via the input device, an authentication unit of a control unit matches a combination of the identification information and the password with a combination of identification information and a password of a registrant which is authentication information of the registrant stored in a storage unit. The authentication unit then authenticates the user when the combination of the inputted identification information and password of the user matches the combination of the identification information and the password of the registrant.

In this modified example, a determination whether or not to enable a function module for executing a predetermined function may also be performed based on a temporal change of a measured value of a distance after a user has been authenticated similarly to the embodiment or modified examples described above. For example, a distance sensor, which is arranged near the input unit, may measure a distance to a hand of a user operating the input unit as a distance to the user. A function control unit then may enable the function module for executing the predetermined function only when the determination unit determines, based on a temporal change of the distance to the hand of the user, that the authenticated user has moved to a position of using the predetermined function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication device comprising:
a function device which executes a predetermined function;
a biometric information acquisition device which acquires biometric information of a user;
a distance measurement device which measures a distance to the user to output a measured value of the distance;
a storage device which stores data representing biometric information of a registrant;
a processor configured to:
compare the acquired biometric information of the user with the biometric information of the registrant and authenticate the user when the biometric information of the user matches the biometric information of the registrant;
determine whether or not to allow use of the predetermined function according to a temporal change of the measured value of the distance after the user has been authenticated; and
control enabling and disabling of the function device based on a determination result of allowing or not allowing the use of the predetermined function,
wherein the determination result allowing or not allowing the use of the predetermined function allows the use of the predetermined function when a trajectory of the temporal change of the measured value of the distance after the user has been authenticated reaches within an activation range without the trajectory deviating from a predetermined tolerable range, and
wherein the predetermined tolerable range shifts to become closer to the activation range in response to an elapsed time from a time when the user has been authenticated.

2. The biometric authentication device according to claim 1, wherein the determination result allowing or not allowing the use of the predetermined function does not allow the use of the predetermined function when the measured value of the distance deviates from the tolerable range after the user has been authenticated.

3. The biometric authentication device according to claim 2, wherein the determination result allowing or not allowing the use of the predetermined function does not allow the use of the predetermined function when the measured value of the distance deviates from the activation range the threshold value after the function module has been enabled.

4. The biometric authentication device according to claim 1, wherein the biometric information is a vein pattern of a hand and the distance measurement device measures a distance to the hand of the user as the distance to the user.

5. A biometric authentication method comprising:
authenticating a user when biometric information of the user matches biometric information of a registrant by comparing the biometric information of the user acquired by a biometric information acquisition device with the biometric information of the registrant represented in data stored in a storage device;
determining whether or not to allow use of a predetermined function according to a temporal change of a measured value of a distance to the user measured by a distance measurement device after the user has been authenticated; and
controlling enabling and disabling of the function device based on a determination result of allowing or not allowing the use of the predetermined function,
wherein the determining whether or not to allow the use of the predetermined function determines to allow the use of the predetermined function when a trajectory of the temporal change of the measured value of the distance after the user has been authenticated reaches within an activation range without the trajectory deviating from a predetermined tolerable range, and
wherein the predetermined tolerable range shifts to become closer to the activation range in response to an elapsed time from a time when the user has been authenticated.

6. The biometric authentication method according to claim 5, wherein the determining whether or not to allow use of the predetermined function determines not to allow the use of the predetermined function when the measured value of the distance deviates from the tolerable range after the user has been authenticated.

7. The biometric authentication method according to claim 6, wherein the determining whether or not to allow use of the predetermined function determines not to allow the use of the predetermined function when the measured value of the distance deviates from the activation range after the function module has been enabled.

8. The biometric authentication method according to claim 5, wherein the biometric information is a vein pattern of a hand and the distance measurement device measures a distance to the hand of the user as the distance to the user.

9. An authentication device comprising:
a function device which executes a predetermined function;
an input device which acquires authentication information of a user;
a distance measurement device which measures a distance to the user to output a measured value of the distance;
a storage device which stores authentication information of a registrant;
a processor configured to:
authenticate the user when the acquired authentication information of the user matches the authentication information of the registrant;
determine whether or not to allow use of the predetermined function according to a temporal change of the measured value of the distance after the user has been authenticated; and
control enabling and disabling of the function module based on a determination result of allowing or not allowing the use of the predetermined function,
wherein the determination result allowing or not allowing the use of the predetermined function determines to allow the use of the predetermined function when a trajectory of the temporal change of the measured value of the distance after the user has been authenticated reaches within an activation range without the trajectory deviating from a predetermined tolerable range, and wherein the predetermined tolerable range shifts to become closer to the activation range in response to an elapsed time from a time when the user has been authenticated.

\* \* \* \* \*